United States Patent
Chow et al.

[11] Patent Number: 6,158,013
[45] Date of Patent: Dec. 5, 2000

[54] MULTI-OUTPUT MONOLITHIC DEVICE WITHOUT GENERATING SIMULTANEOUS SWITCH OUTPUT (SSO)

[75] Inventors: Yu-Chun Chow; Chun-Tsung Lee, both of Hsinchu, Taiwan

[73] Assignee: ADMTEK, Incorporated, Hsinchu, Taiwan

[21] Appl. No.: 09/135,878

[22] Filed: Aug. 18, 1998

[30] Foreign Application Priority Data

Feb. 4, 1998 [TW] Taiwan .................................. 87101421

[51] Int. Cl.[7] ....................................................... G06F 11/00
[52] U.S. Cl. .............................. 713/401; 710/65; 710/58
[58] Field of Search .................................... 713/401, 400, 713/200; 709/104, 105, 100, 107; 714/728, 739, 814, 818; 710/65, 58

[56] References Cited

U.S. PATENT DOCUMENTS

| | | | |
|---|---|---|---|
| 4,409,592 | 10/1983 | Hunt | 340/825.5 |
| 4,890,009 | 12/1989 | Miyazaki et al. | 327/108 |
| 4,910,735 | 3/1990 | Yamashita | 714/732 |
| 5,727,212 | 3/1998 | Dinallo | 709/301 |
| 5,929,683 | 7/1999 | Menkhoff | 327/292 |
| 5,944,833 | 8/1999 | Ugon | 713/400 |
| 5,948,102 | 9/1999 | Wuidart | 713/200 |

*Primary Examiner*—Albert De Cady
*Assistant Examiner*—Omar A. Omar
*Attorney, Agent, or Firm*—Merchant & Gould P.C.

[57] ABSTRACT

The invention relates to a multi-output monolithic device, and particularly to a multi-output monolithic integrated circuit device without generating a simultaneous switch output (SSO) in communication or in a network, in which the plurality of output port will not switch from "0" to "1" or from "1" to "0" simultaneously to prevent insufficient power supply caused by a simultaneous switch, resulting in noise generation and errorous operations. A multi-bit shift register in used in the invention to make each output port have a different and to reduce the probability of the same output value on each output port, thereby reducing the influence of SSO. Then, a slightly different delay is made of each output port during output, so as to eliminate SSO.

2 Claims, 1 Drawing Sheet

MULTI-OUTPUT MONOLITHIC DEVICE WITHOUT GENERATING SIMULTANEOUS SWITCH OUTPUT (SSO)

BACKGROUND OF THE INVENTION

1. Field of the Invention

The invention relates to a multi-output monolithic device, and particularly to a multi-output monolithic IC device for the communication of the network, in which the plurality of output port will not switch from "0" to "1" or from "1" to "0" simultaneously.

2. Description of the Related Art

Generally, a networking IC is designed based on ANSI standard, wherein a single port pseudo random generator is just suitable for an IC device with a single output port. Therefore, as to a multi-output port IC device, a simultaneous switch output (SSO) of the plurality of ports can not only be avoided but also be overcome. Since the out of the plurality ports of a multi-output port monolithic IC device switch simultaneously whatever from "0" to "1" or from "1" to "0" (that is SSO), more power will be consumed, resulting in noises created inside the chip and errorous operations. In order to resolve the above-mentioned problem in the prior art, the number of grounding points of the IC device are increased, namely increasing Vcc and $V_G$ to reduce noises caused by SSO. However, this method will also increase the number of pins on the IC device, resulting in increasing cost and excessive volume of the IC device.

SUMMARY OF THE INVENTION

The object of the invention is to provide a low-cost multi-output port monolithic device, wherein the probability for generating the same output values on the plurality of output port of the device is reduced so as to eliminate SSO and noises as well as errorous operations caused by SSO.

The other object of the invention is that only one pseudo random generator is used to overcome the simultaneous switch output problem in the multi-output port monolithic device without increasing the number of gate.

DETAILED DESCRIPTION OF THE INVENTION

In general, a communication or networking IC is designed based on ANSI standard, adopting a single port pseudo random generator, wherein each shift register represents a single bit. As to a single output port monolithic IC device, a simultaneous switch (0→1 or 1→0) output problem will never happen. However, as to a multi-output port monolithic IC device, even a plurality of pseudo random generators are utilized therein, the simultaneous switch output problem on the plurality of output ports can not be resolved, and the gate number of the device will be increased. Since I/O switches consume large power, the simultaneous switch output will result in large power consummation and logic errors so as to occur errorous operations inside the devise.

In order to resolve the simultaneous switch output problem for the multi-output port monolithic IC device, the invention uses a multi-bit shift register to cause the plurality of output ports of the device to generate different pseudo random generator without increasing pseudo random generators (that is, only one pseudo random generator is shared), thereby extremely reducing the probability of the same output value on each output port. Moreover, clock sampling delays are used to make the output of each output port have a different time delay, so that the simultaneous switch output problem of the output ports can be overcome.

Figure 1:
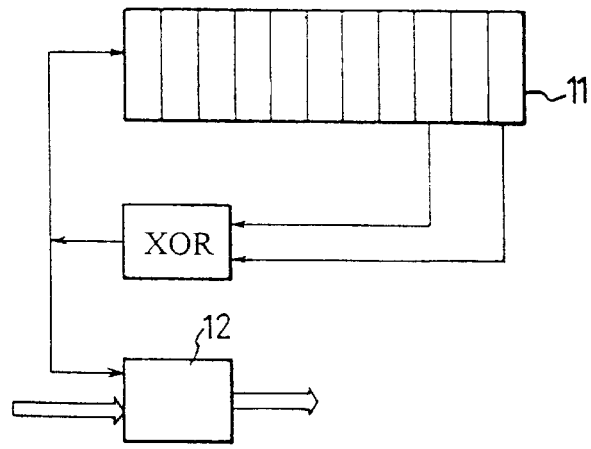
FIG. 1 is a schematic view illustrating a conventional monolithic IC device based on ANSI standard.
Figure 2:
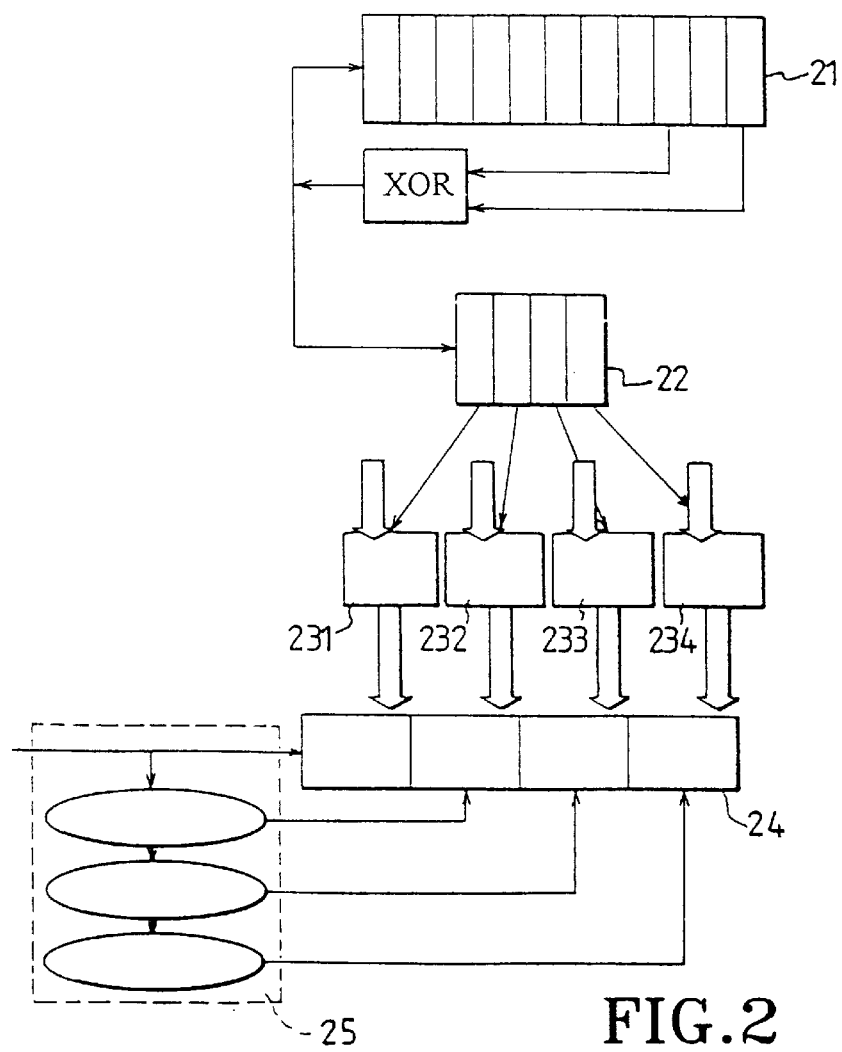
FIG. 2 is a schematic view illustrating a multi-output port monolithic IC device in accordance with the invention.

Referring to FIG. 1, a monolithic IC device based on ANSI standard is shown, wherein only one pseudo random generator 11 is used. The output of the pseudo random generator 11 is combined with the data to be output by a combiner 12. However, such a design can not solve the simultaneous switch output problem in the multi-output port device because there exists only one pseudo random generator. Referring to FIG. 2, a multi-output port monolithic IC device according to an embodiment of the invention is shown, wherein only one pseudo random generator 21 is used. The output of the pseudo random generator 21 is first transmitted to and stored in order in shift register device 22. The register number of the shift register device 22 must be equal to the number of the output ports of the monolithic IC device. That is, if the device has 4 output ports, the shift register device 22 must contain 4 shift registers, and if the device has 8 output ports, the shift register device 22 must contain 8 shift registers, and the like. Therefore, the scramble codes of the output ports are different from each other. In the embodiment shown in FIG. 2, a monolithic device having 4 output port is taken as an example (i.e. the shift register device 22 is a 4-bit shift register device). Four scramble codes of the shift register device 22 are combined with the data to be output from 4 output ports (not shown) of the device by 4 combiners 231, 232, 233 and 234, respectively, so that the probability for the 4 output ports having the same output value is greatly reduced. After that, the combined data of the 4 scramble codes of the shift register device 22 and output data to be output from the 4 output ports are transmitted to a transceiver 24, and then output from the 4 output ports (not shown) of the monolithic device. Before the combined data stored in the 4 bits of the transceiver 24 are respectively transmitted to the output ports, different delay clock samplings are applied to the 4 bits of the transceiver 24 respectively by a delay circuit 25. Therefore, there are time differences between the data each stored in the 4 bits of the transceiver 24 to the 4 output ports, respectively. That is, the switching time of the output value on each output port is different in order to prevent the simultaneous output switch. Based on the above, the simultaneous switch output problem on the output ports of the multi-output port monolithic device is resolved by low cost without increasing the number of the pseudo random generators and the gate number of the device.

In the embodiment described above, only one monolithic device with 4 output ports is taken as an example. The invention can be utilized in a monolithic device with a plurality of output ports. Any concept or structure similar to that of the invention is all included in claims described hereinafter.

What is claimed is:

1. A multi-output port monolithic device without a simultaneous switch output generated, wherein the plurality of ports do not switch simultaneously, thereby avoiding insufficient power supply on the device and errors in operations, comprising:

a single port scramble code generator;

a multi-bit shift register device for storing scramble codes generated by the single port scramble code generator;

a plurality of combiners which respectively combine the scramble codes stored in each bit of the multi-bit shift register device and data to be output from the plurality of output ports; and a transceiver for receiving combined data and transmitting the combined data to the plurality of output ports.

2. A multi-output port monolithic device as claimed in claim 1, wherein the bit number of the shift register device is equal to the output port number of the multi-output port monolithic device.

* * * * *